US012601396B2

(12) United States Patent
Shumka et al.

(10) Patent No.: US 12,601,396 B2
(45) Date of Patent: Apr. 14, 2026

(54) PREDICTIVE MODELING OF HEALTH OF A DRIVEN GEAR IN AN OPEN GEAR SET

(71) Applicants: Thomas Shumka, Kelowna (CA);
Jason Shumka, Kelowna (CA)

(72) Inventors: Thomas Shumka, Kelowna (CA);
Jason Shumka, Kelowna (CA)

(73) Assignee: Minenovation Technologies, Inc.,
Kelowna (CA)

( * ) Notice: Subject to any disclaimer, the term of this
patent is extended or adjusted under 35
U.S.C. 154(b) by 337 days.

(21) Appl. No.: 17/792,391

(22) PCT Filed: Jan. 13, 2021

(86) PCT No.: PCT/CA2021/050028
§ 371 (c)(1),
(2) Date: Jul. 12, 2022

(87) PCT Pub. No.: WO2021/142539
PCT Pub. Date: Jul. 22, 2021

(65) Prior Publication Data
US 2023/0049526 A1     Feb. 16, 2023

(30) Foreign Application Priority Data

Jan. 13, 2020     (CA) ................................. CA 3068179

(51) Int. Cl.
*F16H 57/01*     (2012.01)
*G01M 13/021*     (2019.01)
*G01M 13/028*     (2019.01)

(52) U.S. Cl.
CPC .......... *F16H 57/01* (2013.01); *G01M 13/021*
(2013.01); *G01M 13/028* (2013.01); *F16H*
*2057/012* (2013.01)

(58) Field of Classification Search
CPC .......................... F16H 2057/012; F16H 57/01;
G01M 13/021; G01M 13/028; G01N
21/952
See application file for complete search history.

(56) References Cited

U.S. PATENT DOCUMENTS

| | | | |
|---|---|---|---|
| 5,031,648 A | * | 7/1991 | Lutener .................... C11D 3/43 |
| | | | 134/40 |
| 5,146,938 A | * | 9/1992 | Lutener .................. C23G 5/024 |
| | | | 134/40 |

(Continued)

FOREIGN PATENT DOCUMENTS

WO     WO-2018010008 A1 *     1/2018     ............... B08B 3/02

OTHER PUBLICATIONS

Gao et al., Multidimensional Tensor-Based Inductive Thermography With Multiple Physical Fields for Offshore Wind Turbine Gear Inspection, IEEE, 2016 (Year: 2016).*

(Continued)

*Primary Examiner* — Kyle R Quigley
(74) *Attorney, Agent, or Firm* — Baumgartner Patent Law, LLC; Marc Baumgartner

(57) ABSTRACT

A system for predictive modeling of wear or damage to a driven gear of an open gear set is provided. A method of developing a predictive model of wear or damage to a driven gear of an open gear set is also provided. The system and method allow for autonomous, non-interfering dynamic collection of data that are used to assist in developing maintenance schedules for large open gear sets. More specifically, it is directed to utilizing data from monitored pinion gears of girth gear sets under full load operating conditions to predict health of a girth gear in the girth gear set.

22 Claims, 18 Drawing Sheets

(56) References Cited

U.S. PATENT DOCUMENTS

| | | | | | |
|---|---|---|---|---|---|
| 5,564,149 | A * | 10/1996 | Matesic | ................. | A46B 15/00 |
| | | | | | 15/160 |
| 6,259,222 | B1 * | 7/2001 | Kira | ........................ | B02C 25/00 |
| | | | | | 241/35 |
| 7,817,845 | B2 * | 10/2010 | Suh | .................... | G01N 27/9046 |
| | | | | | 382/141 |
| 2002/0112745 | A1 * | 8/2002 | Belanger | ................... | B60S 3/04 |
| | | | | | 134/123 |
| 2002/0161617 | A1 * | 10/2002 | Washburn | ............. | G06Q 10/20 |
| | | | | | 705/305 |
| 2008/0034904 | A1 * | 2/2008 | Baker | .................... | B02C 17/24 |
| | | | | | 74/89.36 |
| 2008/0154459 | A1 * | 6/2008 | Grichnik | ............... | G06Q 10/06 |
| | | | | | 340/438 |
| 2009/0308417 | A1 * | 12/2009 | Belanger | ................... | B60S 3/04 |
| | | | | | 134/123 |
| 2010/0256932 | A1 * | 10/2010 | Kar | .................... | G01M 13/021 |
| | | | | | 702/56 |
| 2013/0291672 | A1 * | 11/2013 | Hess | ..................... | G01D 5/245 |
| | | | | | 74/412 R |
| 2013/0335067 | A1 * | 12/2013 | Dwyer | ................... | G01D 5/145 |
| | | | | | 324/207.11 |
| 2014/0339335 | A1 * | 11/2014 | Petit | ....................... | B08B 3/024 |
| | | | | | 239/548 |
| 2014/0347043 | A1 * | 11/2014 | Chana | ................ | G01N 27/9046 |
| | | | | | 324/242 |
| 2019/0143381 | A1 * | 5/2019 | Shumka | ................... | C11D 3/43 |
| | | | | | 134/32 |
| 2019/0234892 | A1 * | 8/2019 | Harrington | ............ | B64D 45/00 |
| 2020/0074412 | A1 * | 3/2020 | Colena | ..................... | G06N 5/01 |
| 2021/0383160 | A1 * | 12/2021 | Vander Neut | ....... | G06F 18/2413 |

OTHER PUBLICATIONS

Elgargni et al., A Comparative Study of Signal and Image Processing Systems for Condition Monitoring of Milling Processes Using Artificial Intelligence, IEEE, 2013 (Year: 2013).*

Abbas et al., The Effect of Tool Fixturing Quality on the Design of Condition Monitoring Systems for Detecting Tool Conditions, JJMIE, 2011 (Year: 2011).*

Shumka, Gearing up for better maintenance, IEEE, 2015 (Year: 2015).*

Hankes, Gear Driven Rotary Kilns, IEEE, 2015 (Year: 2015).*

Holland, Airless Spray Technology For Lubricating Open Gears, Machinery Lubrication, Nov. 19, 2010 (Year: 2010).*

* cited by examiner

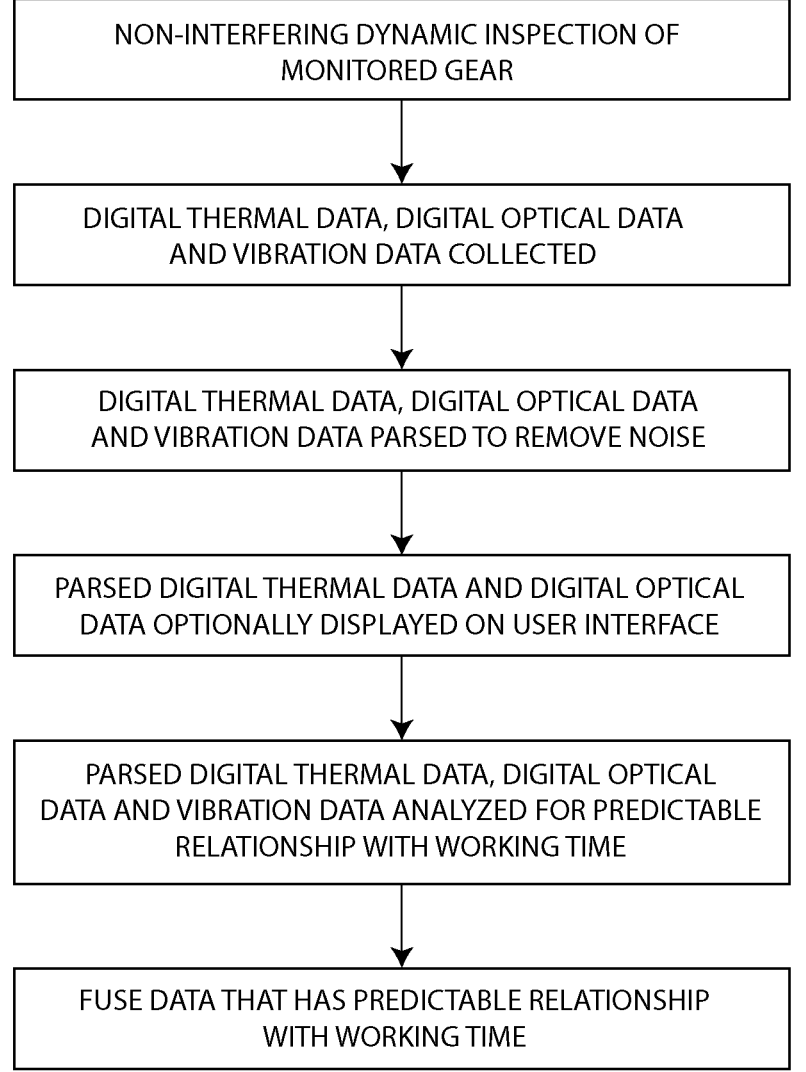

NON-INTERFERING DYNAMIC INSPECTION OF
MONITORED GEAR

DIGITAL THERMAL DATA, DIGITAL OPTICAL DATA
AND VIBRATION DATA COLLECTED

DIGITAL THERMAL DATA, DIGITAL OPTICAL DATA
AND VIBRATION DATA PARSED TO REMOVE NOISE

PARSED DIGITAL THERMAL DATA AND DIGITAL OPTICAL
DATA OPTIONALLY DISPLAYED ON USER INTERFACE

PARSED DIGITAL THERMAL DATA, DIGITAL OPTICAL
DATA AND VIBRATION DATA ANALYZED FOR PREDICTABLE
RELATIONSHIP WITH WORKING TIME

FUSE DATA THAT HAS PREDICTABLE RELATIONSHIP
WITH WORKING TIME

FIG. 4

COLLECT NEW VIBRATION DATA

PARSE NEW VIBRATION DATA TO REMOVE
NOISE

PREVIOUS PARSED DIGITAL THERMAL DATA AND DIGITAL
OPTICAL DATA ANALYZED FOR PREDICTABLE RELATIONSHIP
WITH PARSED NEW VIBRATION DATA

FUSE DATA THAT HAS PREDICTABLE RELATIONSHIP
WITH VIBRATION DATA

Condition Numbers

| 1 | 3 | 6 | 9 |
|---|---|---|---|
| Good | Fair | Serious | Critical |

2.4.6.8.10.12.14.16.18.20.22.24.26.28.30.32.34.36.38.40.42.44.46.48.50.52.54.56.58.60.62.64.66.68.70.72.74.76.78.80

| Good | Fair | Serious | Critical |
|---|---|---|---|

FIG. 7

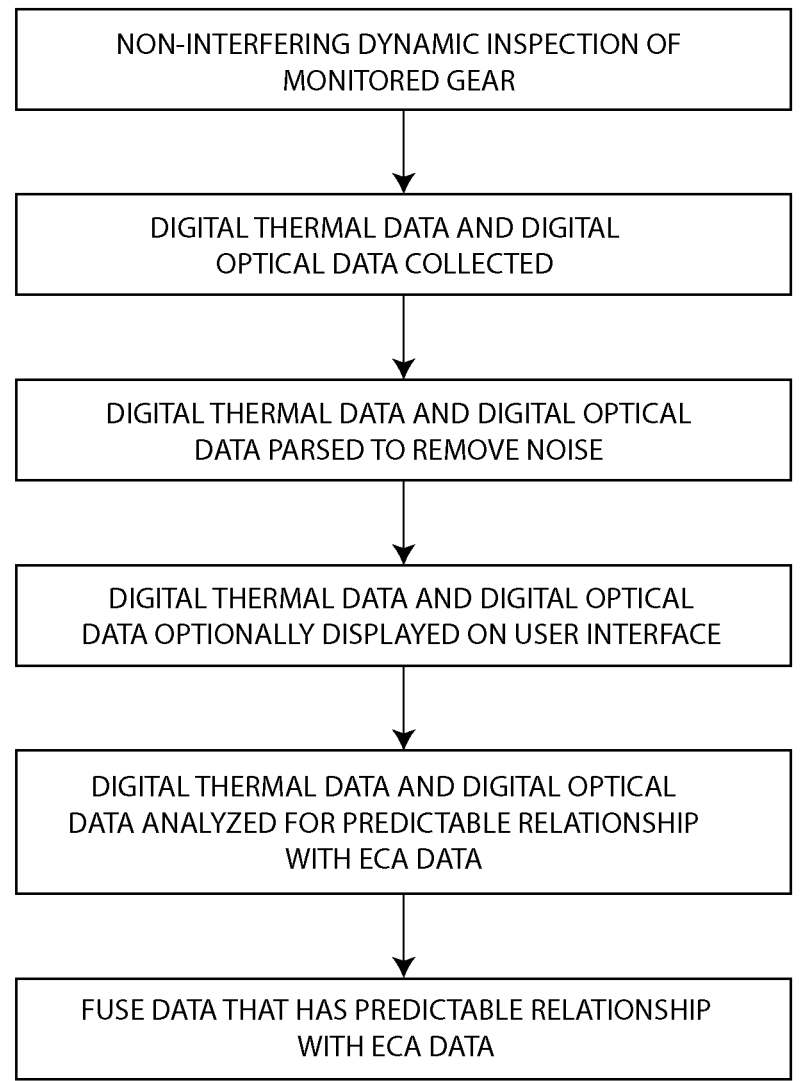

NON-INTERFERING DYNAMIC INSPECTION OF
MONITORED GEAR

DIGITAL THERMAL DATA AND DIGITAL
OPTICAL DATA COLLECTED

DIGITAL THERMAL DATA AND DIGITAL OPTICAL
DATA PARSED TO REMOVE NOISE

DIGITAL THERMAL DATA AND DIGITAL OPTICAL
DATA OPTIONALLY DISPLAYED ON USER INTERFACE

DIGITAL THERMAL DATA AND DIGITAL OPTICAL
DATA ANALYZED FOR PREDICTABLE RELATIONSHIP
WITH ECA DATA

FUSE DATA THAT HAS PREDICTABLE RELATIONSHIP
WITH ECA DATA

FIG. 8

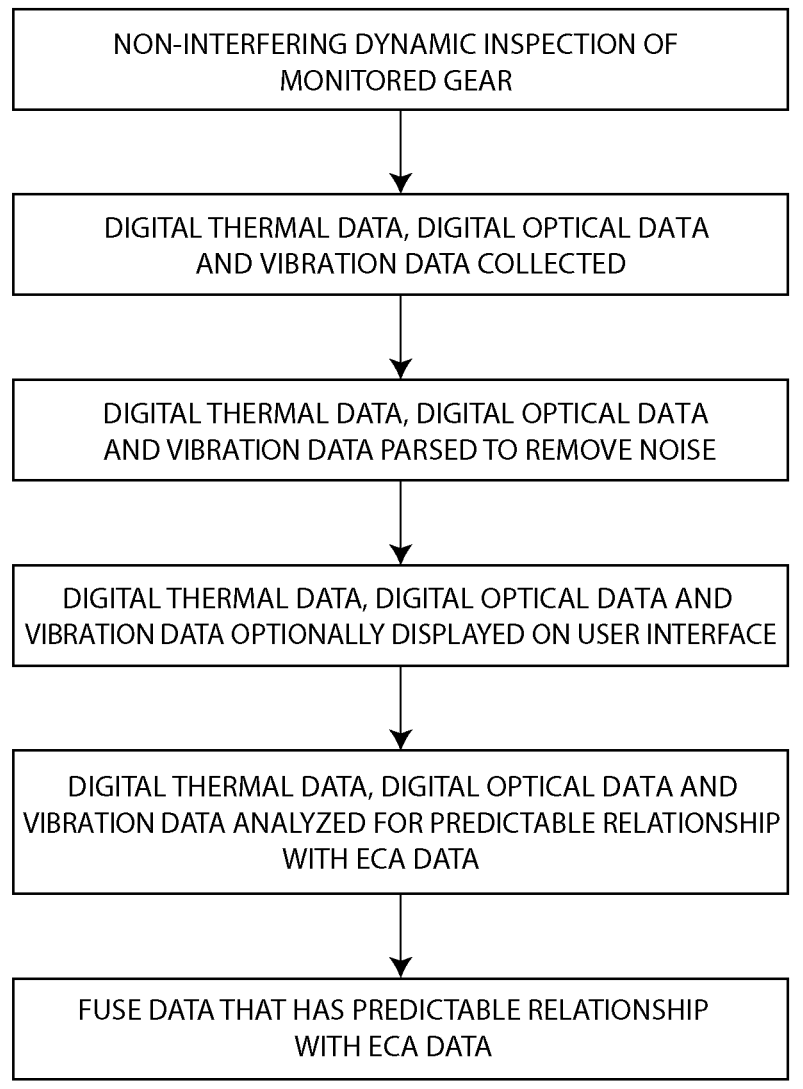

NON-INTERFERING DYNAMIC INSPECTION OF
MONITORED GEAR

DIGITAL THERMAL DATA, DIGITAL OPTICAL DATA
AND VIBRATION DATA COLLECTED

DIGITAL THERMAL DATA, DIGITAL OPTICAL DATA
AND VIBRATION DATA PARSED TO REMOVE NOISE

DIGITAL THERMAL DATA, DIGITAL OPTICAL DATA AND
VIBRATION DATA OPTIONALLY DISPLAYED ON USER INTERFACE

DIGITAL THERMAL DATA, DIGITAL OPTICAL DATA AND
VIBRATION DATA ANALYZED FOR PREDICTABLE RELATIONSHIP
WITH ECA DATA

FUSE DATA THAT HAS PREDICTABLE RELATIONSHIP
WITH ECA DATA

FIG. 12

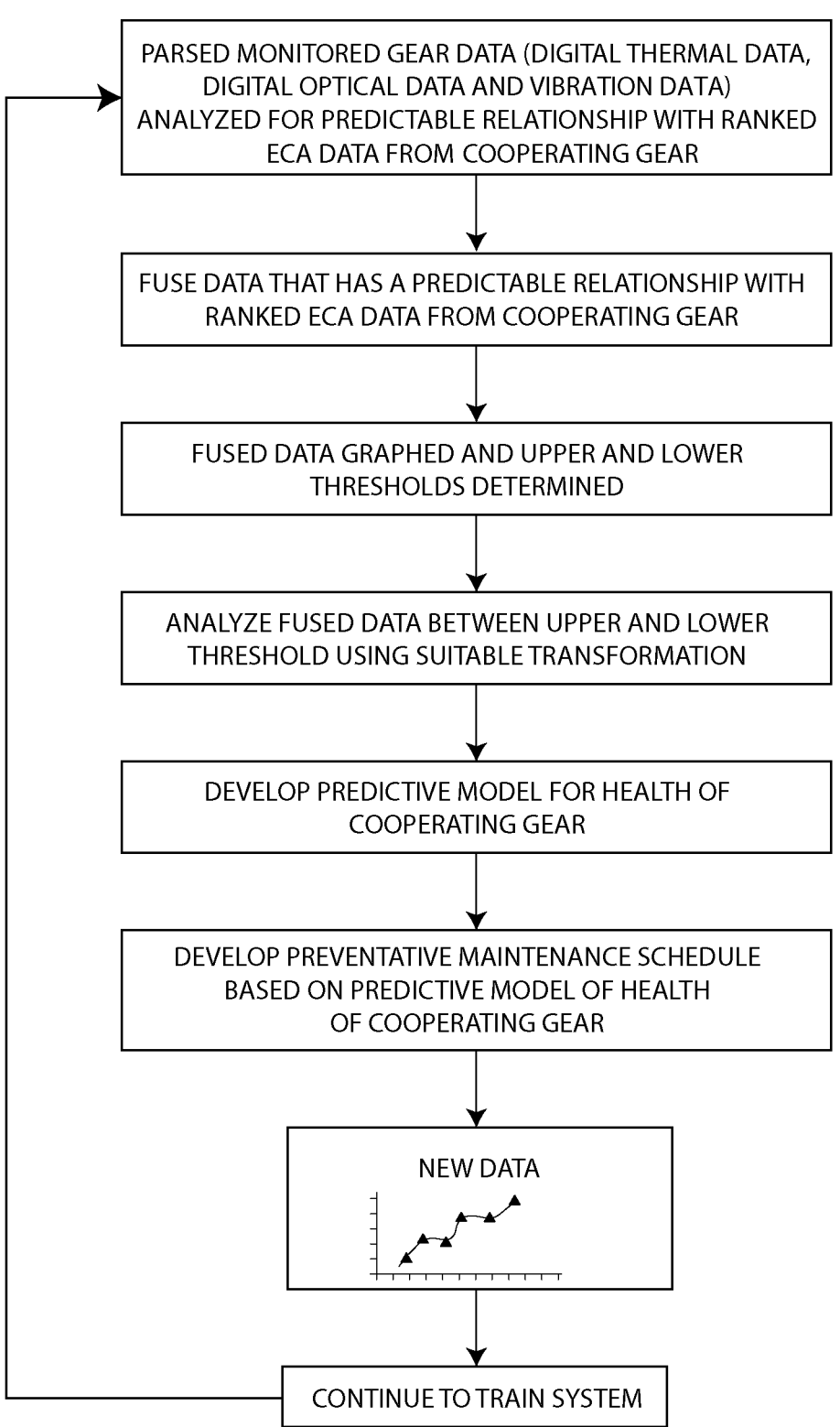

PARSED MONITORED GEAR DATA (DIGITAL THERMAL DATA, DIGITAL OPTICAL DATA AND VIBRATION DATA) ANALYZED FOR PREDICTABLE RELATIONSHIP WITH RANKED ECA DATA FROM COOPERATING GEAR

FUSE DATA THAT HAS A PREDICTABLE RELATIONSHIP WITH RANKED ECA DATA FROM COOPERATING GEAR

FUSED DATA GRAPHED AND UPPER AND LOWER THRESHOLDS DETERMINED

ANALYZE FUSED DATA BETWEEN UPPER AND LOWER THRESHOLD USING SUITABLE TRANSFORMATION

DEVELOP PREDICTIVE MODEL FOR HEALTH OF COOPERATING GEAR

DEVELOP PREVENTATIVE MAINTENANCE SCHEDULE BASED ON PREDICTIVE MODEL OF HEALTH OF COOPERATING GEAR

NEW DATA

CONTINUE TO TRAIN SYSTEM

FIG. 13

PREDICTIVE MODELING OF HEALTH OF A DRIVEN GEAR IN AN OPEN GEAR SET

CROSS REFERENCE TO RELATED APPLICATIONS

The present invention is filed under 35 U.S.C. § 371 as the U.S. national phase of International Application No. PCT/CA2021/050028, filed Jan. 13, 2021, which designated the United States and claims the benefit of priority to Canadian Patent Application No. 3068179, filed Jan. 13, 2020. The entire disclosures of the above-identified priority applications are hereby fully incorporated herein by reference.

FIELD

The present technology is directed to a method and system for developing maintenance schedules for large open gear sets based on predictive modeling. More specifically, it is directed to utilizing data from monitored pinion gears of girth gear sets under full load operating conditions to predict health of a girth gear in the girth gear set.

BACKGROUND

The inspection, asset management, and reliability analysis of open gear-driven rotating equipment are paramount for the industry to avoid catastrophic failures in its operation. An accurate, reliable and robust system for gear condition monitoring and predictive maintenance (CMPM) is highly desired to meet such needs. The monitoring and predictive maintenance solution not only can guarantee the reliability of gear-driven equipment but also reduce the maintenance cost during their lifecycle management. However, the implementation of such a system for predictive maintenance is commonly restricted by insufficient measurement data and complicated degradation mechanisms associated with the equipment and its operation.

Non-destructive inspection of open gears identifies defects and wear of the open gears. For example, Canadian Patent Application Serial number 2956749 discloses a form-fitting eddy current array probe for inspecting helical gears and a method of inspecting a girth gear set including a helical gear and a girth gear using the form-fitting eddy current array probe. This, therefore, only identifies existing problems. Further, this non-destructive inspection requires that the gear teeth be cleared of slurry and cleaned before being inspected, which therefore results in downtime for the entire operation.

Canadian Patent Number 3034204 discloses an installation for inspecting pinion gear teeth wear and breakage. Wear and breakage can be identified by comparing the edge characteristics of a new gear tooth to that of a gear tooth that is functioning under normal operating conditions. A region of higher heat is indicative of wear or breakage. The photographs from the visible light camera (machine vision) will show breakage and may show wear. Contamination may also be seen in the photographic images from the visible light camera and from an increase in temperature in the infrared images. Poor lubrication patterns can also be seen in the photographic images from the visible light camera and from an increase in temperature in the infrared images. This installation, therefore, identifies existing problems with pinion gears, which may or may not include damage or wear. These gears as small and less costly to repair or replace in comparison to girth gears.

Annamalai et al. (Applied Mechanics and Materials (Volume 372), pages 292-296) focused on predicting the fatigue life expectancy of a girth gear-pinion assembly used in cement industries. Gear design and modeling was carried out using a CAD package and analysis was done using finite element analysis software, ANSYS. AISI 4135-low alloy steel material properties were considered and linear elastic finite element analysis and fatigue life analysis were carried out. The variable amplitude load was applied to simulate the real time loading of the gear-pinion assembly. Rainflow cycle counting algorithm and Minars linear damage rule were employed to predict the fatigue life. The critical stress and the corresponding deformation were discussed in the results. Finally the life expectancy of the girth gear and pinion assembly was estimated which would be useful for the periodical maintenance of the gear assembly. The study was strictly theoretical and does not provide information on existing gears in situ. The reference can also be found at: https://doi.org/10.4028/www.scientific.net/AMM.372.292

U.S. Patent Application Publication No. 20190095781 discloses techniques, including systems and methods for monitoring a rotating equipment. A sensor that is in proximity of the rotating equipment senses vibrations of the rotating equipment. The sensor generates a digital signal corresponding to the vibrations of the rotating equipment and transmits the digital signal over a communication network. A server receives the digital signal and pre-processes the digital signal using ensemble empirical mean decomposition (EEMD) technique. The server processes the digital signal using wavelet neural network (WNN) to detect faults in the rotating equipment. Further, the server processes the digital signal using the wavelet neural network to predict remaining useful life (RUL) of the rotating equipment. This is specifically for closed systems. As vibration is an indicator of damage, wear or misalignment resulting from damage or wear, the predictive ability is limited to diagnostics and predicting RUL once damage has occurred, rather than prognostics and predicting RUL before damage has occurred.

U.S. Patent Application Publication No. 20180328890 discloses a method of non-destructive testing includes providing a non-destructive tester (NDT), including a first processor and a probe/sensor, and smart glasses including a second processor. During movement of the probe/sensor and a specimen under test (SUT) relative to each other, the probe/sensor outputs an interrogation signal into the SUT and acquires a response of the SUT to the interrogation signal. Data corresponding to the response of the SUT is wirelessly communicated from the first processor to the second processor where the data is processed and produced on a display of the smart glasses as a waveform corresponding to the response. The process can be repeated whereupon a first waveform indicative of no defect in the SUT can be displayed when no defect is detected in the SUT and a second waveform indicative of a defect in the SUT can be displayed when a defect is detected in the SUT. This system does not predictively model wear and damage.

U.S. Patent Application Publication No. 20150039245 discloses an inspection device and method of guiding an inspection probe according to a predetermined inspection plan. The device is couple with a probe which is to be moved according to the inspection plan on the test object, the device including an inspection guide unit having a guide control unit, a position encoding such as a 3-D camera and visual feedback eyewear. The method including facilitating a virtual display of the inspection plan onto the visual feedback eyewear, moving the probe following the virtual display of the inspection plan, sensing sensed probe positions in real time of the inspection using the 3-D camera and validating the sensed probe position against the inspection plan using the control module. Then the information of the step of validating, such as those spots at which the probe is moved out of the tolerance of the inspection plan, is displayed on the feedback eyewear. This system does not provide testing results to the user via the visual feedback eyewear and simply provides an inspection guide for the user to follow.

What is needed is a system that integrates data from non-destructive testing of a driver gear of an open gear set with predictive maintenance and machine learning algorithms to provide predictive models of gear health and potential failure modes of the driven gear. It would be preferable if the system allowed for monitoring of driver gear under full load operating conditions. It would be further preferable if the system could autonomously shut down and enter into a cleaning mode in which the gears are inched and cleaned. It would be further preferable if the system allowed for development of predictive maintenance schedules for the larger and more expensive driven gear. It would be preferable if the system was autonomous.

SUMMARY

The present technology is a system that integrates data from non-destructive testing of a driver gear of an open gear set with predictive maintenance and machine learning algorithms to provide predictive models of gear health and potential failure modes of the driven gear. The system allows for monitoring of the driver gear under full load operating conditions. The system can autonomously shut down and enter into a cleaning mode in which the gears are inched and cleaned. The system also allows for development of predictive maintenance schedules for the larger, more expensive driven gear. The system is autonomous.

In one embodiment, a system for developing a predictive model of wear or damage to an open gear set, which comprises a driven gear and a driver gear, is provided, the system comprising: an eddy current array probe, which is configured to generate and transmit scans of teeth of one gear of the open gear set; at least one non-interfering dynamic imager which is positioned and configured to generate and transmit digital images of another gear of the open gear set; and a computing device which is electronic communication with the eddy current array probe and the non-interfering dynamic imager, and which includes a memory and a processor, the processor under control of the memory, wherein the memory is configured to receive the scans from the eddy current array probe and receive the digital images from the non-interfering dynamic imager, determine changes in both the scans and the digital images over time, statistically analyze the changes in relation to time to provide a set of time-based features, apply the time-based features as input values to a selected transformation, and develop a predictive model of health and remaining useful life of the open gear set using the selected transformation.

In the system, the non-interfering dynamic imager may be a thermal sensor.

In the system, the thermal sensor may be an infrared camera.

The system may comprise a second non-interfering dynamic imager which is an optical camera.

In the system, the eddy current array probe may be configured to generate and transmit scans of the driven gear.

In the system, the non-interfering dynamic imager may be positioned to generate and transmit digital images of the driver gear.

In the system, the driven gear may be a girth gear and the driver gear may be a pinion gear of a girth gear set.

The system may further comprise a vibration sensor, the vibration sensor configured to generate and send vibration data to the computing device.

In another embodiment, a system for predictive modeling of wear or damage to a driven gear of an open gear set is provided, the system comprising: at least one non-interfering dynamic imager which is positioned and configured to generate and transmit digital images of a driver gear of the open gear set; and a computing device which is electronic communication with the non-interfering dynamic imager, and which includes a memory and a processor, the processor under control of the memory, wherein the memory retains a predictive model of health and remaining useful life of the driven gear and is configured to receive the digital images of the driver gear, determine changes in the digital images over time, statistically analyze the changes in relation to the predictive model of health and remaining useful life of the driven gear and provide a prediction of health and remaining useful life of the driven gear.

In the system, the non-interfering dynamic imager may be a thermal sensor.

In the system, the thermal sensor may be an infrared camera.

The system may comprise a second non-interfering dynamic imager which is an optical camera.

In the system, the driven gear may be a girth gear and the driver gear may be a pinion gear of a girth gear set.

The system may further comprise a vibration sensor, the vibration sensor configured to generate and send vibration data to the computing device.

In another embodiment, a method of developing a predictive model of wear or damage to an open gear set, which comprises a driven gear and a driver gear, is provided, the method comprising: selecting a system comprising an eddy current array probe, at least one non-interfering dynamic imager and a computing device which is electronic communication with the eddy current array probe and the non-interfering dynamic imager, and which includes a memory and a processor, the processor under control of the memory; the non-interfering dynamic imager generating and transmitting digital images of teeth of a gear of the open gear set to the computer; a user scanning teeth of another gear of the open gear set with the eddy current array probe; the eddy current array probe generating and transmitting scans to the computer; the computer analyzing the data; the computer analyzing, compiling and storing the digital images and the scans as a data set; the computer determining changes in the data set over time, statistically analyzing the changes in relation to time to provide a set of time-based features, applying the time-based features as input values to a selected transformation, and developing a predictive model of health and remaining useful life of the open gear set using the selected transformation.

In the method, the non-interfering dynamic imager may generate thermal digital images.

In the method, a second non-interfering dynamic imager may generate optical digital images.

In the method, a vibration sensor may generate and send vibration data to the computing device.

In the method, the digital images may be of the driver gear and the eddy current array scans may be of the driven gear.

In the method, the non-interfering dynamic imager may autonomously generate and send digital images.

In the method, the driver gear may be a pinion gear and the driven gear may be a girth gear.

In another embodiment, a method of a predictive modeling of wear or damage to an open gear set, which comprises a driven gear and a driver gear, is provided, the method comprising: selecting a at least one non-interfering dynamic imager which is positioned and configured to generate and transmit digital images of the driver gear of the open gear set and a computing device which is electronic communication with the non-interfering dynamic imager, and which includes a memory and a processor, the processor under control of the memory, wherein the memory retains a predictive model of health and remaining useful life of the driven gear; the non-interfering dynamic imager generating and transmitting digital images of teeth of the driver gear of the open gear set to the computer; the computer analyzing, compiling and storing the digital images as a data set; the computer determining changes in the data set over time, statistically analyzing the changes in relation to the predictive model of health and remaining useful life of the driven gear and providing a prediction of health and remaining useful life of the driven gear.

In the method, the non-interfering dynamic imager may generate and transmit digital images autonomously.

FIGURES

FIG. 4 is a flow chart for determining data from an alternative embodiment of non-interfering dynamic inspection of a driver gear that has a predictable relationship with working time.

FIG. 7 is a chart showing ranking of gear condition in relation to AGMA 1010-F14 testing.

FIG. 8 is a flow chart for determining data from non-interfering dynamic inspection of a driver gear that has a predictable relationship with ECA data.

FIG. 12 is a flow chart for determining data from non-interfering dynamic inspection of a driver gear that has a predictable relationship with ECA data.

FIG. 13 is a flow chart for developing a preventative maintenance schedule for a driven gear.

Figures 14A, 14B, 14C:
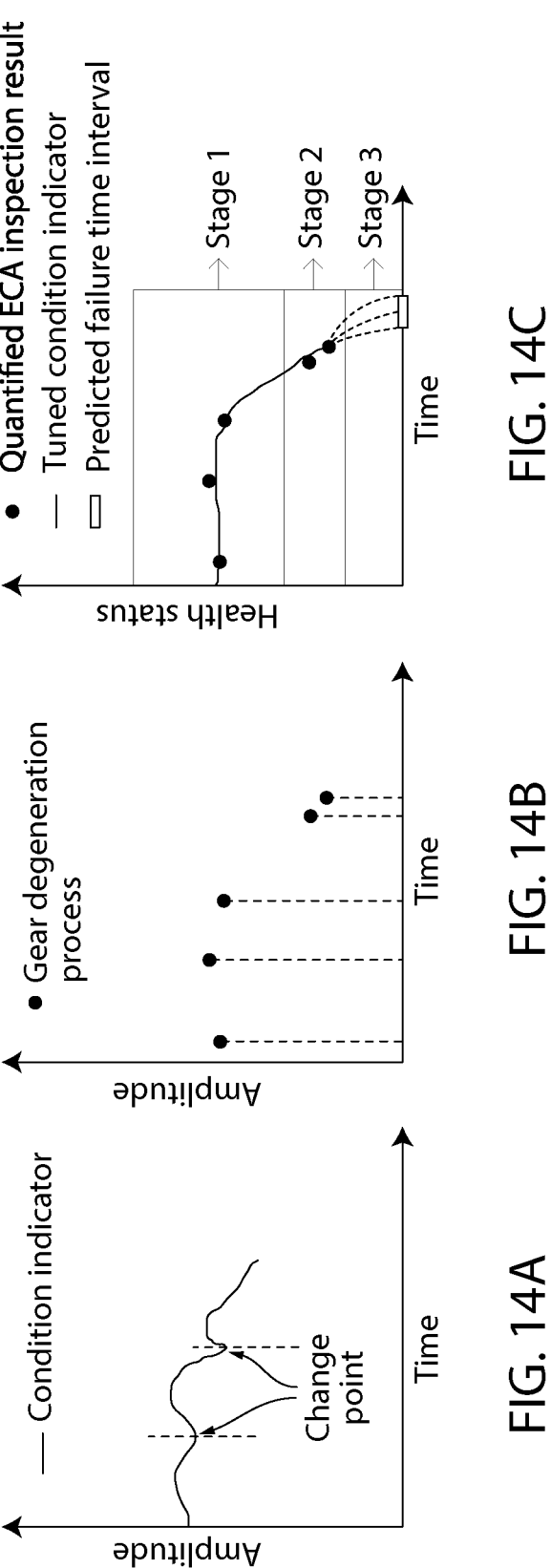

FIG. 14A-C is an example of integrated decision-making: A. monitored open gear condition indicator (thermal imagery, optical imagery and optionally, vibration data); B. cooperating open gear degeneration process (ECA); and C. integrated decision making.

Figure 15:
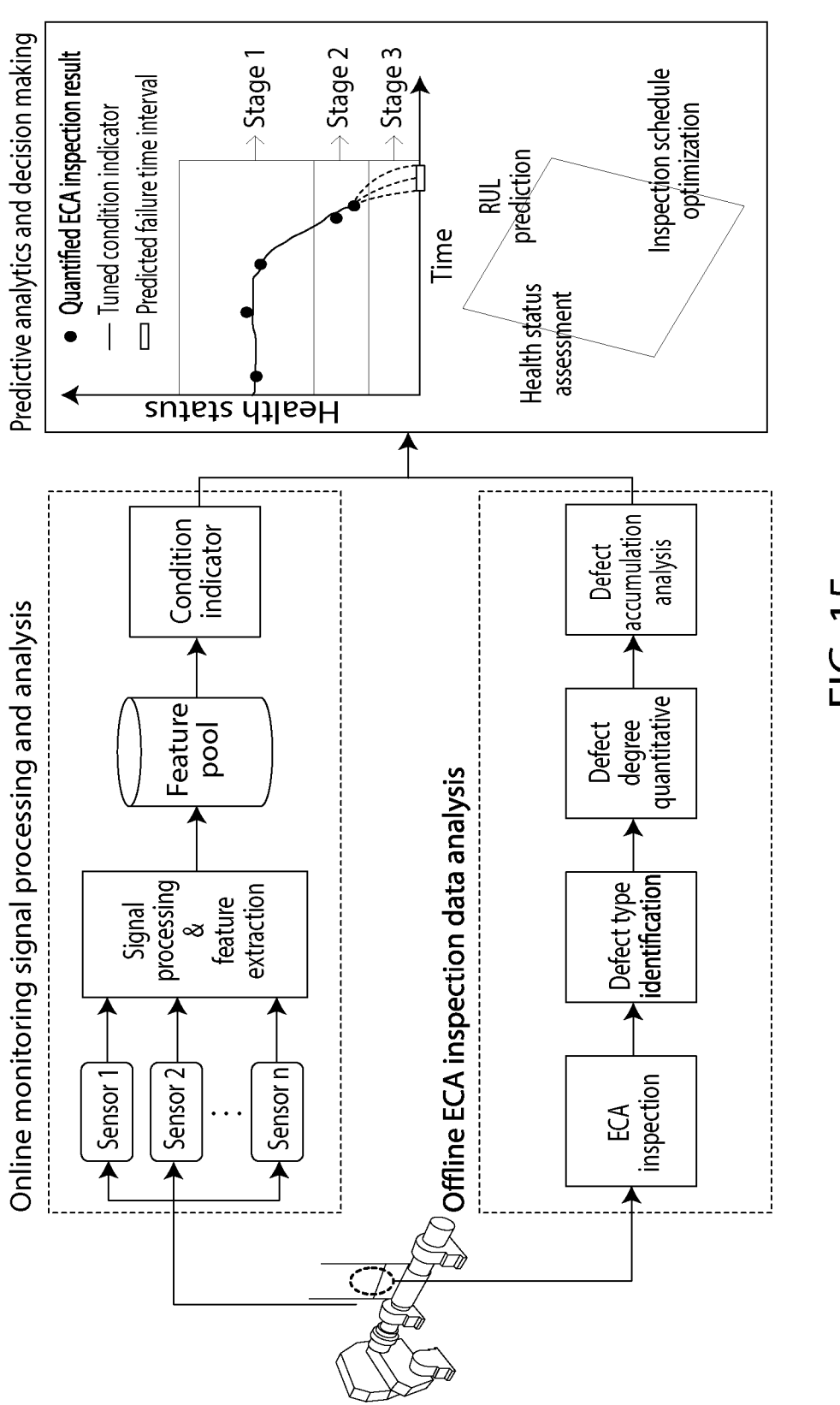

FIG. 15 is a schematic of the overall system architecture for the gear condition monitoring and predictive maintenance (CMPM).

Figure 16:
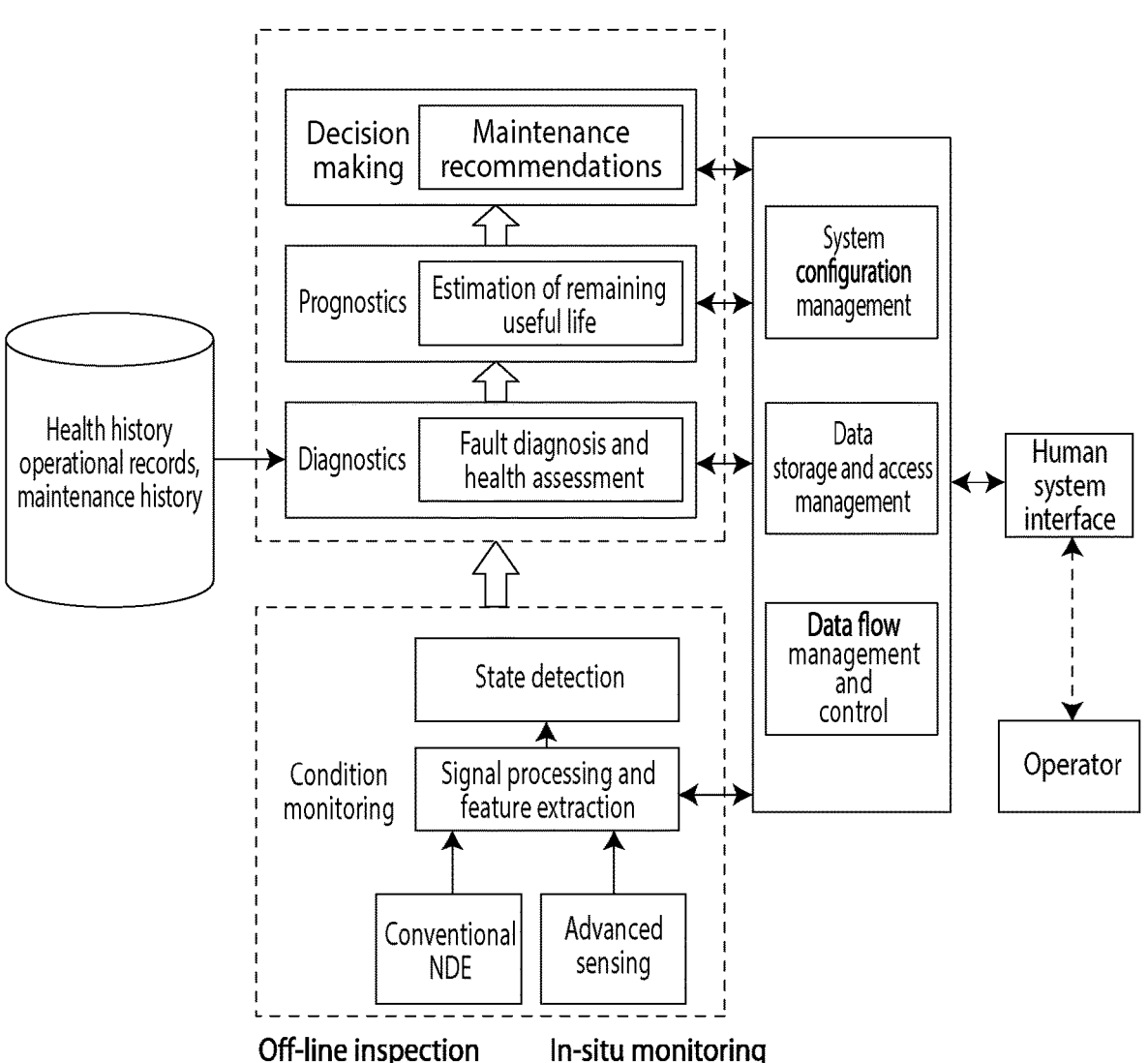

FIG. 16 is a schematic of the open system architecture for CMPM.

Figure 17:
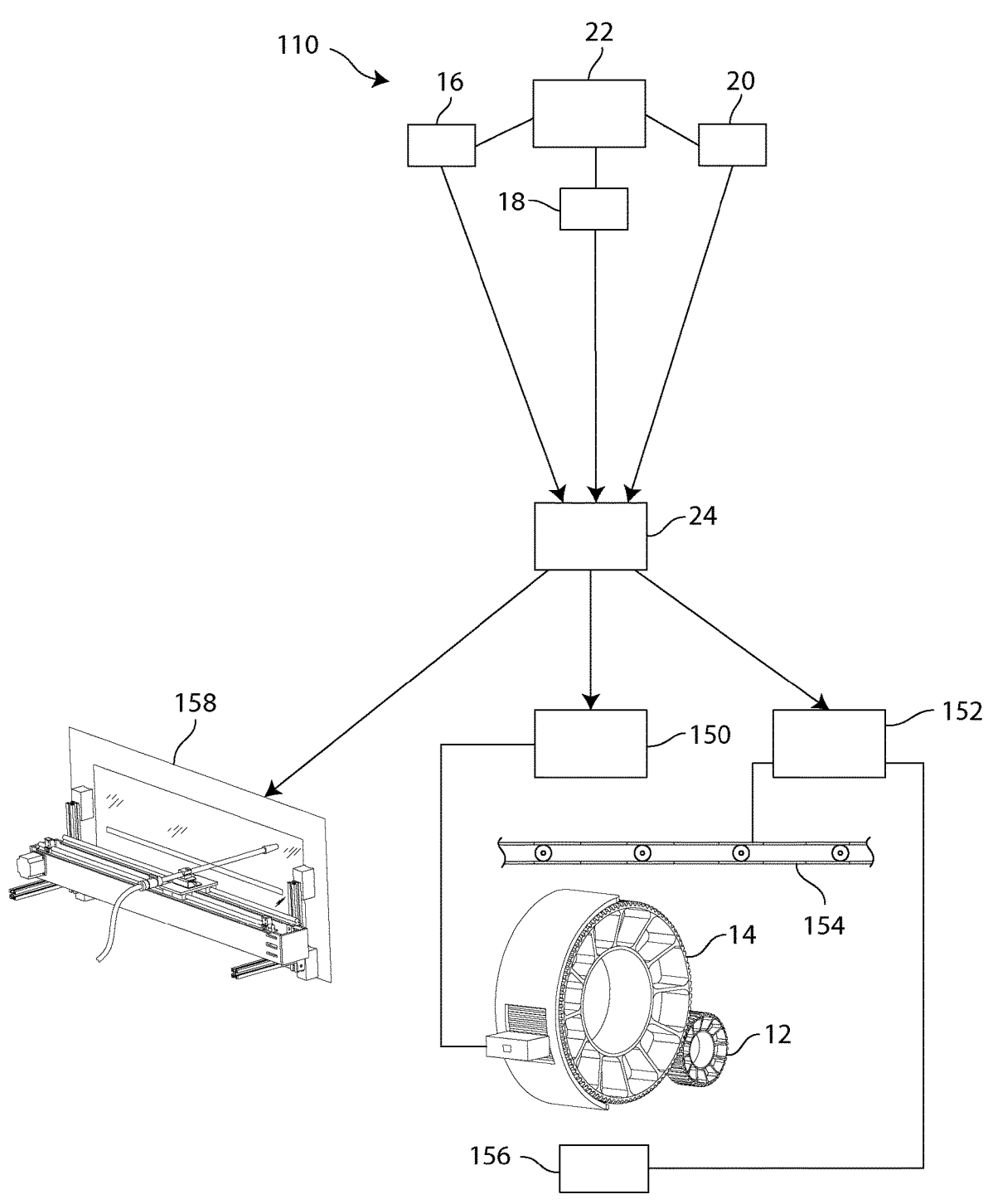

FIG. 17 is schematic of the non-interfering dynamic inspecting system including an autonomous cleaning system of the present technology.

Figure 18:
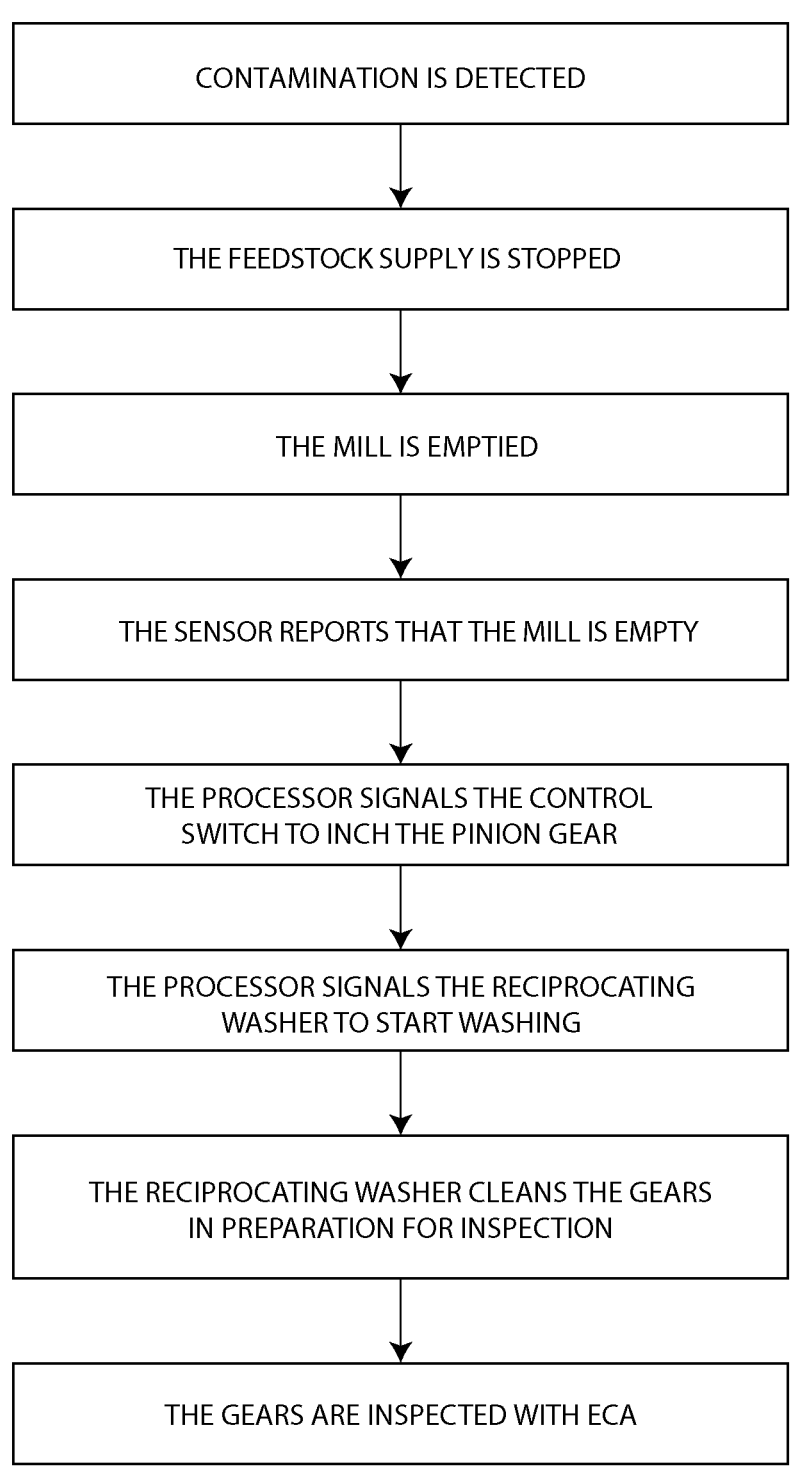

FIG. 18 is a flow chart for autonomous detection and cleaning of a contaminated gear.

DESCRIPTION

Techniques operating according to the principles described herein may be implemented in any suitable manner. The processing and decision blocks of the flow charts above represent steps and acts that may be included in algorithms and/or circuitry that carry out these various processes. Unless otherwise indicated herein, the particular sequence of steps and/or acts described in each flow chart is merely illustrative of the algorithms that may be implemented and can be varied in implementations and embodiments of the principles described herein.

The acts performed as part of a method may be ordered in any suitable way. Accordingly, embodiments may be constructed in which acts are performed in an order different than illustrated, which may include performing some acts simultaneously, even though shown as sequential acts in illustrative embodiments.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included.

The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Open gear—in the context of the present technology, an open gear includes open gears for gear driven rotating equipment and structural components for kilns, calciners, driers, grinding mills and large-scale power transmission equipment commonly used on trunnion and roller supported rotating equipment. An open gear is open to the ambient environment and is not housed in a gear box.

Driver gear—in the context of the present technology, a driver gear is a gear of an open gear set that intermeshes with a driven gear of the open gear set and is in rotational engagement with the driven gear.

Driven gear—in the context of the present technology, a driven gear is one that is intermeshed with a gear that is being monitored and is in rotational engagement with the driver gear. The data from the driver gear is used to predictively model health of the driven gear and to develop preventative maintenance schedules for the driven gear.

Non-interfering inspecting—in the context of the present technology, non-interfering inspecting is inspecting of the gear set under normal operating conditions, for example, under full load conditions.

Dynamic inspecting—in the context of the present technology, dynamic inspecting is routine autonomous inspecting of the driver gear while under normal operating conditions. Monitoring frequency may be based on number of rotations, or number of hours and may be, for example, over one full rotation of the larger gear, or many full rotations of the larger gear per day normal load operating conditions. To be clear, dynamic inspecting includes continual monitoring, which includes continuous monitoring with interruptions (periodic monitoring) and continuous monitoring.

Non-interfering, dynamic inspecting—in the context of the present technology, non-interfering, dynamic inspecting includes inspecting of the driver gear with sensors and cameras that can monitor continuously but may report continuously or periodically. The driver gear may operate under normal operating conditions. This includes advanced sensing.

Interfering, non-destructive inspecting—in the context of the present technology, interfering non-destructive inspecting is inspecting that requires that the gears being inspected are stopped, cleared of rock or other material, cleaned and then inspected. Inspections include but are not limited to eddy current array (ECA) inspection, magnetic particle inspection (MCI), X-ray fluorescence (XRF) inspection and visual inspection. This includes NDE (Non-Destructive Examination)

Non-contact thermal sensor—in the context of the present technology a non-contact thermal sensor includes but is not limited to an infrared camera, an infrared non-contact temperature sensor, a thermal imager and a thermal smartphone module.

Computing device—in the context of the present technology, a computing device includes at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets.

Communication network—in the context of the present technology a communication network includes, but is not limited to a wireless fidelity (Wi-Fi [IEEE 802.11]) network, a light fidelity (Li-Fi) network, a satellite network, the internet, a cellular data network, a local area network (LAN), a wireless local area network (WLAN), or any combination thereof. The network adapter of the computing device communicates via the communication network.

Bayesian network—in the context of the present technology, a Bayesian network is a probabilistic graphical model that represents a set of variables and their conditional dependencies via a directed acyclic graph (DAG).

Computer executable instructions—in the context of the present technology, computer executable instructions include software, including as application software, system software, firmware, middleware, embedded code, or any other suitable type of computer code and also may be compiled as executable machine language code or intermediate code.

Computer readable media—in the context of the present technology, computer readable media includes magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. Computer-readable media is non-transitory and has at least one physical, structural component.

Data mining tools—in the context of the present technology, a data mining tool is for example, but not limited to, Periscope data, Alteryx Analytics, Advanced Miner, Microsoft SQL server Integration Services, Lavastorm Analytics Engine and the like. Data mining tools include: data storage facilities including cloud storage; and transformation algorithms (transformation) such as Naïve Bayes, Decision Tree, Neural Networks, Wavelet Neural Networks, Wavelet Convolutional Neural Networks, Support Vector Machines (SVMs), Logistic Regression, Linear Regression, Non-linear Regression and the like.

DETAILED DESCRIPTION

By integrating online monitoring (autonomous non-interfering dynamic monitoring) and offline non-destructive inspection, an integrated CMPM system was developed that can provide reliable condition assessment, remaining useful life prediction as well as an optimized schedule for open gear maintenance. The overall system consists of three modules or functionalities: real-time monitoring signal processing; non-destructive inspection data analysis; and system integration for predictive analytics and decision making. The sensing signals were collected from the real-time monitoring of the driver gear with at least two sensors mounted proximate the gear-driven equipment. A condition indicator was created to assess driven gear degeneration process from the acquired signals. Based on the designated schedule, the driven gear was inspected with the eddy current array (ECA) technique. The relationship between condition indicator and ECA inspection was explored to achieve integrated decision-making for open gear health assessment, remaining useful life prediction and optimal schedule for inspection.

Figure 1:
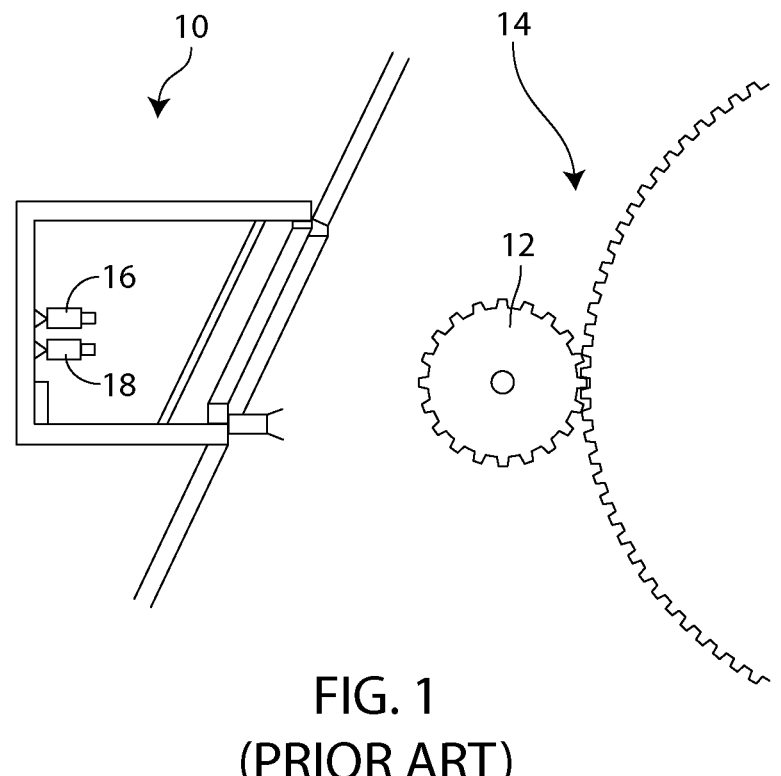
FIG. 1 is a prior art installation for non-interfering, dynamic inspection of a driver gear.

As shown in FIG. 1, a prior art installation, generally referred to as 10 and disclosed in Canadian Patent Number 3034204 dynamically inspects a gear 12, which in this case is a pinion gear of a girth gear set, generally referred to as 14, with a non-contact thermal sensor, which is preferably an infrared camera 16, and an optical camera 18, to provide thermal images and optical images. The thermal images may show regions of heat associated with regions of poor lubrication or poor alignment. Either of these can be predictors of damage. The stop action optical images can show contamination, damage and regions of poor lubrication, again potentially being predictors of damage.

Figure 2:
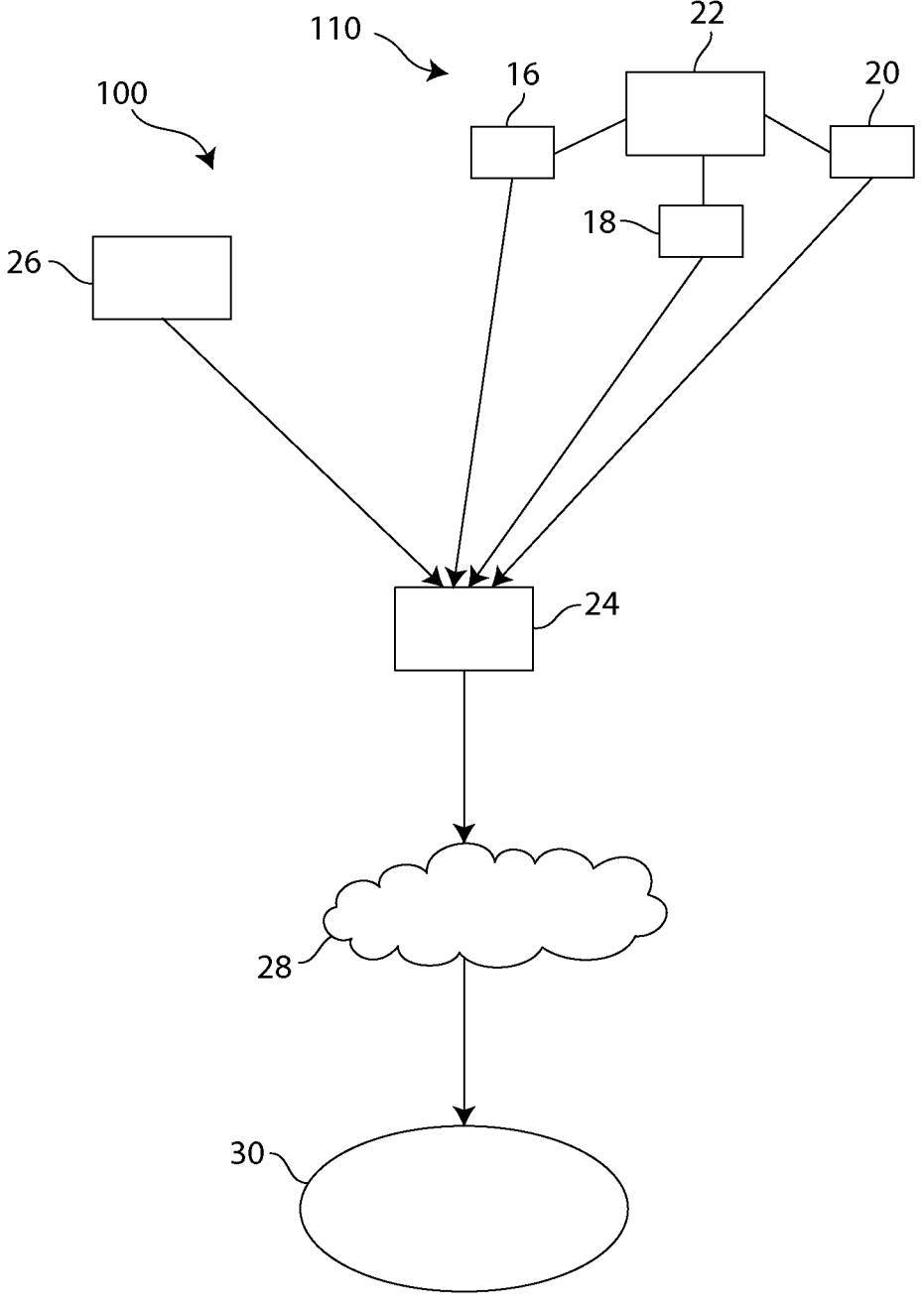
FIG. 2 is a schematic of the system of the present technology.

As shown in FIG. 2, a predictive modeling system, generally referred to as 100 includes a non-interfering dynamic inspecting system, generally referred to as 110 which includes the non-contact thermal sensor 16, the optical camera 18 and a vibration sensor 20, all in communication with a programmable logic controller 22 and at least one computing device 24. An eddy current array detector 26 is also in communication with at least one computing device 124, which in turn is in communication with a data storage facility 28, which may be a cloud storage. A data mining tool 30 is in electronic communication with the data storage facility 22.

Figure 3:
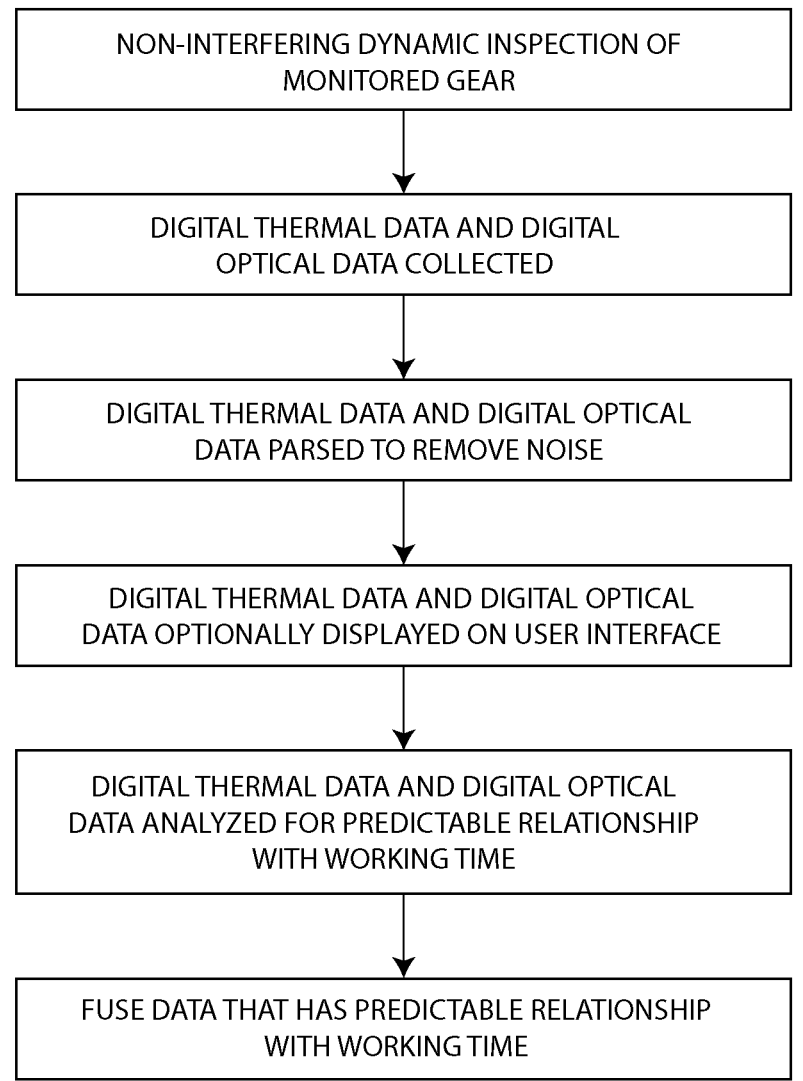
FIG. 3 is a flow chart for determining data from non-interfering dynamic inspection of a driver gear that has a predictable relationship with working time.

As shown in FIG. 3, non-interfering dynamic inspection of the driver gear produced digital thermal data and digital optical data from the thermal sensor and the optical camera, respectively. The data were parsed to remove noise and analyzed to find if there was a predictable relationship with working time. Those data that had a predictable relationship with the working time were fused.

As shown in FIG. 4, the method may further comprise collecting vibration data at the same time that the thermal data and optical data are collected. The data were parsed to remove noise and analyzed to find if there was a predictable relationship with working time. Those data that have a predictable relationship with the working time were fused.

Figure 5:
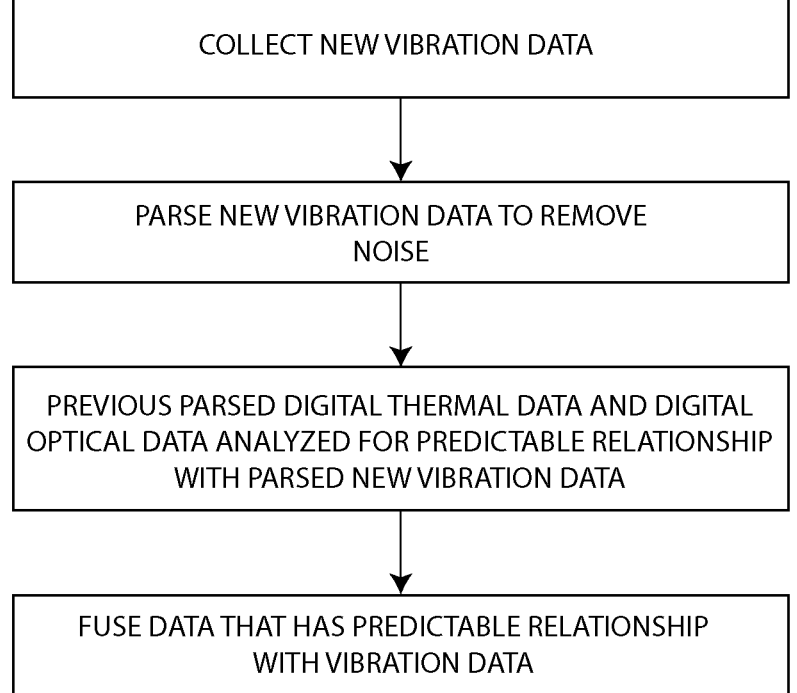
FIG. 5 is a flow chart for determining data from non-interfering dynamic inspection of a driver gear that has a predictable relationship with vibration data.

As shown in FIG. 5, new vibration data were collected and parsed to remove noise. The parsed data were then used to determine whether or not the earlier collected thermal and/or optical data can be used as a predictor of vibration. Without being bound to theory, if vibration is above a selected acceptable threshold, there is already damage occurring. Thus, the thermal data and/or the optical data may be used as early predictors of conditions that will lead to damage.

Online monitoring (non-interfering dynamic inspection) can provide a continuous update of the monitored open gear health condition during its operation. ECA inspection can provide a detailed, reliable and robust assessment of the cooperating (driven) open gear health status, however the measurement process is cumbersome and require the shutdown of the entire open gear set. Thus, the online monitoring signal was compared to the offline ECA inspection to achieve an assessment of the cooperating open gear health condition, remaining useful life and inspection schedule.

Figure 6:
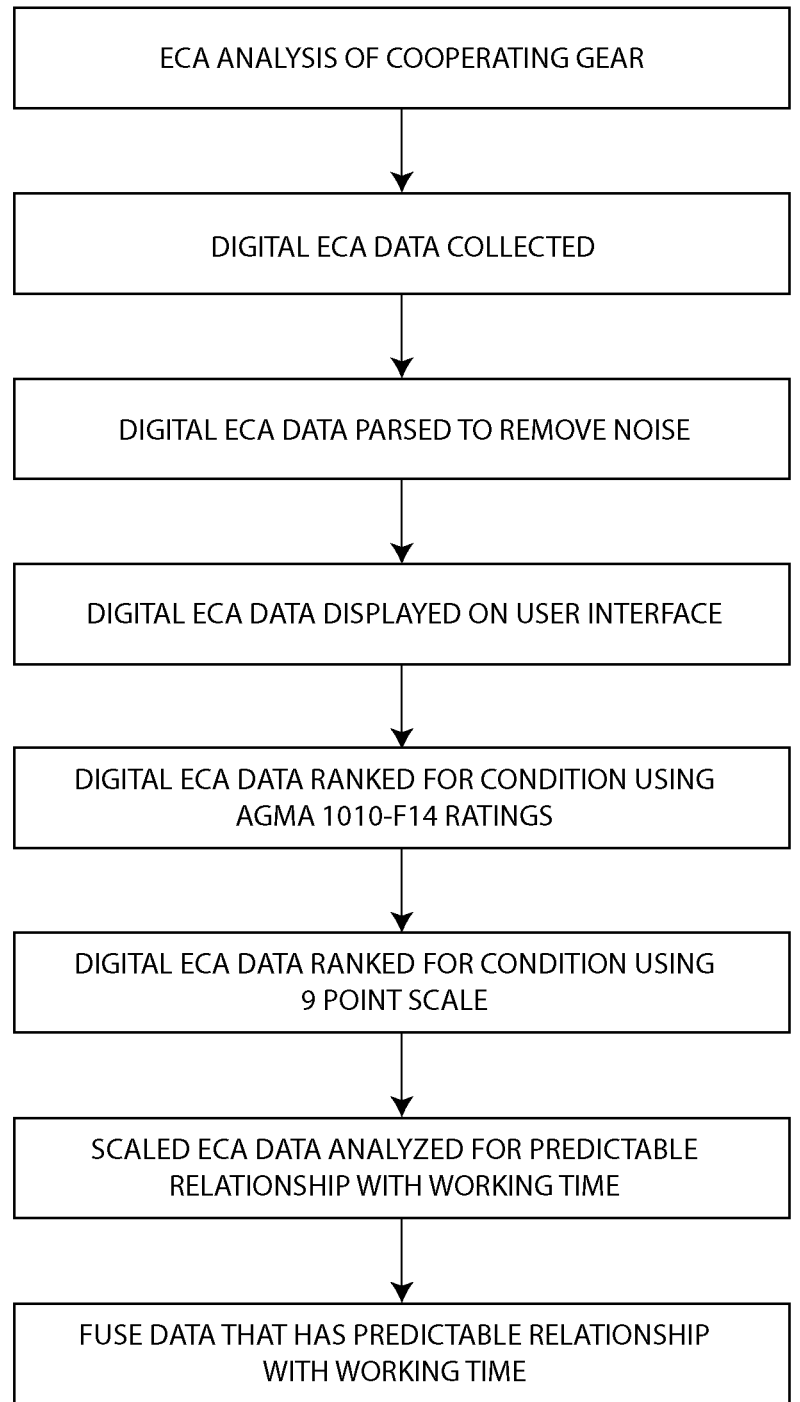
FIG. 6 is a flow chart for determining data from ECA analysis that has a predictable relationship with working time.

As shown in FIG. 6, the driven gear, which in one embodiment is a girth gear of a girth gear set was stopped and the teeth were examined using eddy current array technology. The data were parsed to remove noise, displayed, ranked and scaled, then analyzed to find if there was a predictable relationship with working time. Those data that have a predictable relationship with the working time were fused. Both wear and damage can be quantified.

FIG. 7 shows the relationship between the AGMA 1010-F14 ranking (shown in Table 1) and scaling of the AGMA ranking into a 1 to 9 scale.

TABLE 1

| Gear Tooth Condition Assessment Based On AGMA 1010-F14 | | | | |
|---|---|---|---|---|
| Class | General mode | Specific mode or degree | Value | AGMA Value |
| Wear | Adhesion | Mild | 1 | 1 |
| Wear | Adhesion | Moderate | 3 | 2 |
| Wear | Abrasion | Mild | 3 | 3 |
| Wear | Abrasion | Moderate | 4 | 4 |
| Wear | Abrasion | Severe | 9 | 5 |
| Wear | Polishing | Mild | 1 | 6 |
| Wear | Polishing | Moderate | 3 | 7 |
| Wear | Polishing | Severe | 6 | 8 |
| Wear | Corrosion | Mild | 1 | 9 |
| Wear | Corrosion | Moderate | 3 | 10 |
| Wear | Corrosion | Severe | 6 | 11 |
| Wear | Fretting | True brinelling | 3 | 12 |
| Wear | Fretting | False brinelling | 3 | 13 |
| Wear | Fretting | Fretting corrosion | 3 | 14 |
| Wear | Scaling | | 3 | 15 |
| Wear | White layer flaking | | 3 | 16 |
| Wear | Cavitation | | 3 | 17 |
| Wear | Erosion | | 3 | 18 |
| Wear | Electrical discharge | | 3 | 19 |
| Scuffing | Scuffing | Mild | 3 | 20 |
| Scuffing | Scuffing | Moderate | 4 | 21 |
| Scuffing | Scuffing | Severe | 9 | 22 |
| Plastic deformation | Indention | Mild non active or <5% Tooth Area | 1 | 23 |
| Plastic deformation | Indentation | Moderate active 25%-75% Tooth Area | 3 | 24 |
| Plastic deformation | Indentation | Severe active >75% Tooth Area or large singe indent | 9 | 25 |
| Plastic deformation | Cold flow | Mild non active or <5% Face | 3 | 26 |
| Plastic deformation | Cold flow | Moderate active 5%-25% Face | 6 | 27 |
| Plastic deformation | Cold flow | Severe active >25% Face | 9 | 28 |
| Plastic deformation | Cold flow | Rolling Mild non active | 1 | 29 |
| Plastic deformation | Cold flow | Rolling Moderate pitch line is apparent | 3 | 30 |
| Plastic deformation | Cold flow | Rolling Severe well defined large ridge at pitchline | 6 | 31 |

TABLE 1-continued

Gear Tooth Condition Assessment Based On AGMA 1010-F14

| Class | General mode | Specific mode or degree | Value | AGMA Value |
|---|---|---|---|---|
| Plastic deformation | Cold flow | Rippling Mild non active or <5% Face | 3 | 32 |
| Plastic deformation | Cold flow | Rippling Moderate active 5%-25% Face | 4 | 33 |
| Plastic deformation | Cold flow | Rippling Severe active >25% Face | 6 | 34 |
| Plastic deformation | Cold flow | Tooth hammer | 3 | 35 |
| Plastic deformation | Cold flow | Ridging | 3 | 36 |
| Plastic deformation | Cold flow | Topland Burr Mild <0.03" high | 1 | 37 |
| Plastic deformation | Cold flow | Topland Burr Moderate 0.03"-0.06" | 3 | 38 |
| Plastic deformation | Cold flow | Topland Burr Severe >0.06" high or breaking free | 6 | 39 |
| Plastic deformation | Cold flow | Edge Burr Mild <0.03" high | 1 | 40 |
| Plastic deformation | Cold flow | Edge Burr Moderate 0.03"-0.06" high | 3 | 41 |
| Plastic deformation | Cold flow | Edge Burr Severe >0.06" high or breaking free | 6 | 42 |
| Plastic deformation | Cold flow | Root fillet yielding | 3 | 43 |
| Plastic deformation | Cold flow | Tip-to-root interference Moderate scuffing, and mild plastic deformation | 6 | 44 |
| Plastic deformation | Cold flow | Tip-to-root Interference Severe, scuffing, severe plastic deformation | 9 | 45 |
| Plastic deformation | Cold flow | Tight Mesh Moderate mild scuffing or wear mild plastic deformation on non drive flank | 6 | 46 |
| Plastic deformation | Cold flow | Tight Mesh Severe, moderate-severe scuffing or wear, severe plastic deformation on non drive flank | 9 | 47 |
| Plastic deformation | Hot flow | Mild <5% | 6 | 48 |
| Plastic deformation | Hot flow | Moderate 5%-25% Face | 8 | 49 |
| Plastic deformation | Hot flow | Severe >25% Face | 9 | 50 |
| Hertzian fatigue | Macropitting | Nonprogressive | 1 | 51 |
| Hertzian fatigue | Macropitting | Progressive Mild <5% Face | 3 | 52 |
| Hertzian fatigue | Macropitting | Progressive Moderate 5%-25% Face | 6 | 53 |
| Hertzian fatigue | Macropitting | Progressive Severe >25% Face | 9 | 54 |
| Hertzian fatigue | Macropitting | Point-Surface-Origin | 6 | 55 |
| Hertzian fatigue | Macropitting | Spalling | 9 | 56 |
| Hertzian fatigue | Micropitting | Progressive Mild <5% Face | 3 | 57 |
| | Micropitting | Progressive Moderate 5%-25% Face | 6 | 58 |
| | Micropitting | Progressive Severe >25% Face | 9 | 59 |
| Hertzian fatigue | Subsurface Initiated Failure | | 9 | 60 |
| Hertzian fatigue | Subcase fatigue | | 9 | 61 |
| Cracking | Hardening cracks | | 9 | 62 |

TABLE 1-continued

Gear Tooth Condition Assessment Based On AGMA 1010-F14

| Class | General mode | Specific mode or degree | Value | AGMA Value |
|---|---|---|---|---|
| Cracking | Grinding damage | | 9 | 63 |
| Cracking | Rim and web cracks | | 9 | 64 |
| Cracking | Case/core separation | | 9 | 65 |
| Cracking | Fatigue cracks | | 9 | 66 |
| Fracture | Brittle fracture | | 9 | 67 |
| Fracture | Ductile fracture | | 9 | 68 |
| Fracture | Mixed mode fracture | | 9 | 69 |
| Fracture | Tooth shear | | 9 | 70 |
| Fracture | Fracture after plastic deformation | | 9 | 71 |
| Bending fatigue | Low-cycle fatigue <10,000 Cycles | | 9 | 72 |
| Bending fatigue | High-cycle fatigue >10,000 Cycles | Root fillet cracks | 9 | 73 |
| Bending fatigue | | Profile cracks | 9 | 74 |
| Bending fatigue | | Tooth end cracks | 9 | 75 |
| Bending fatigue | | Subsurface-initiated bending fatigue cracks | 9 | 76 |
| Bending fatigue | | Tooth interior fatigue fracture (TIFF) | 9 | 77 |

A Bayesian network was developed to merge data from ECA results and from the non-interfering dynamic inspecting system, which in this case is temperature data. The data are first used to determine whether or not repairs are needed. This can be determined from the ECA data, the temperature data or both. The temperature data refers to the temperature difference across different lengths of the tooth, with A to E spanning the entire length of the tooth. The data from both the ECA inspection and the temperature profiles are merged and processed using historical data to arrive at a determination of the health of the gear. Again, using historical data with the new data, a decision as to next steps is made.

As shown in FIG. 8, the non-interfering dynamic inspection of the driver gear was used to predict the health of the driven gear. ECA results from the driven gear were used to determine if there was a predictable relationship between the ECA results and one or more of the digital thermal data and the digital optical data of the driver gear.

Figure 9:
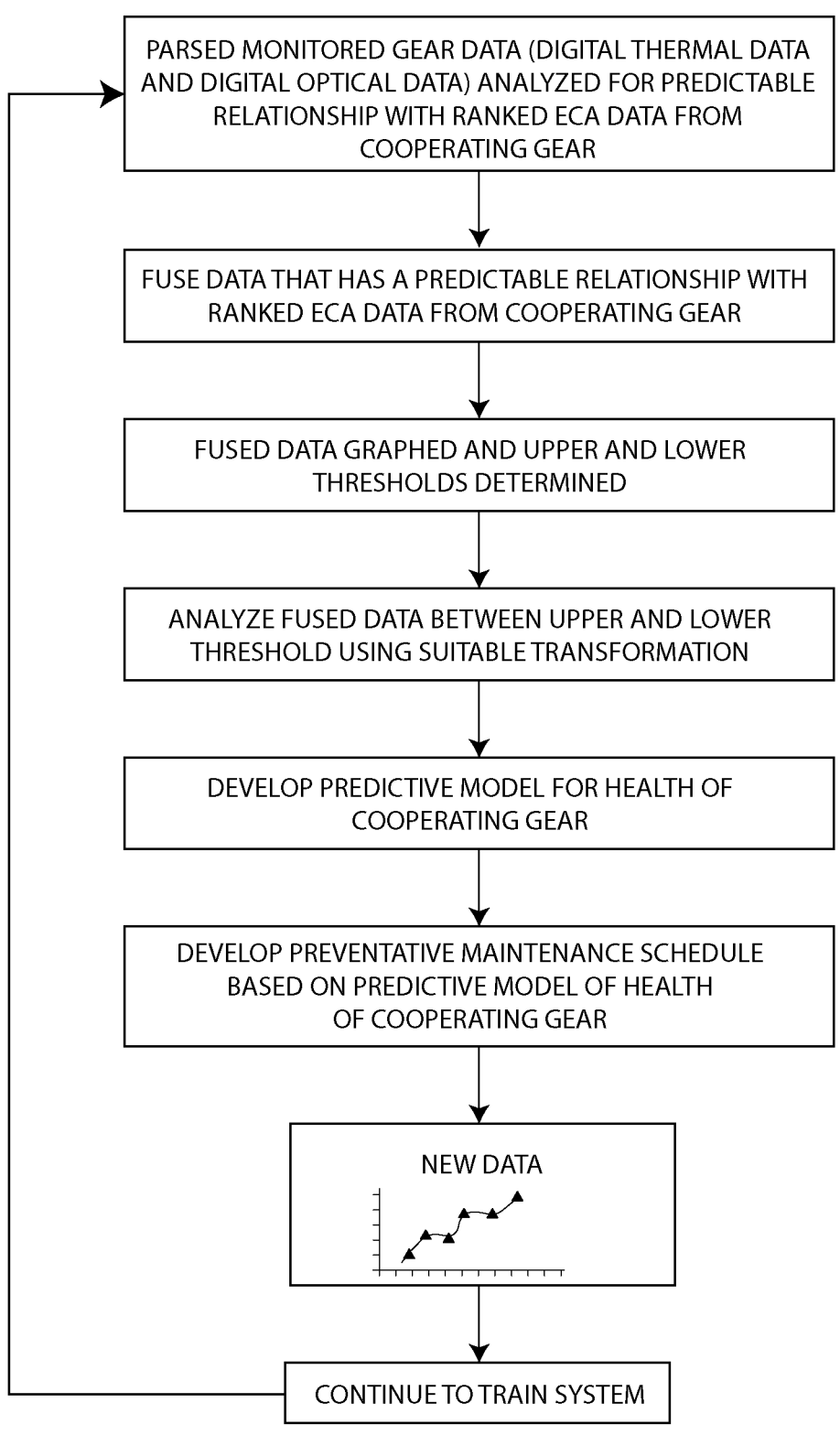
FIG. 9 is a flow chart for developing a preventative maintenance schedule for a driven gear.

As shown in FIG. 9, those data from the driver gear that had a predictable relationship with the ECA data from the driven gear were graphed and the upper and lower thresholds defining a healthy open gear and an unhealthy open gear were defined. An early predictive model of health was determined and used to develop a preventative maintenance schedule for the driven gear. The addition of new data allows for the system to continue to be trained.

Figure 10:
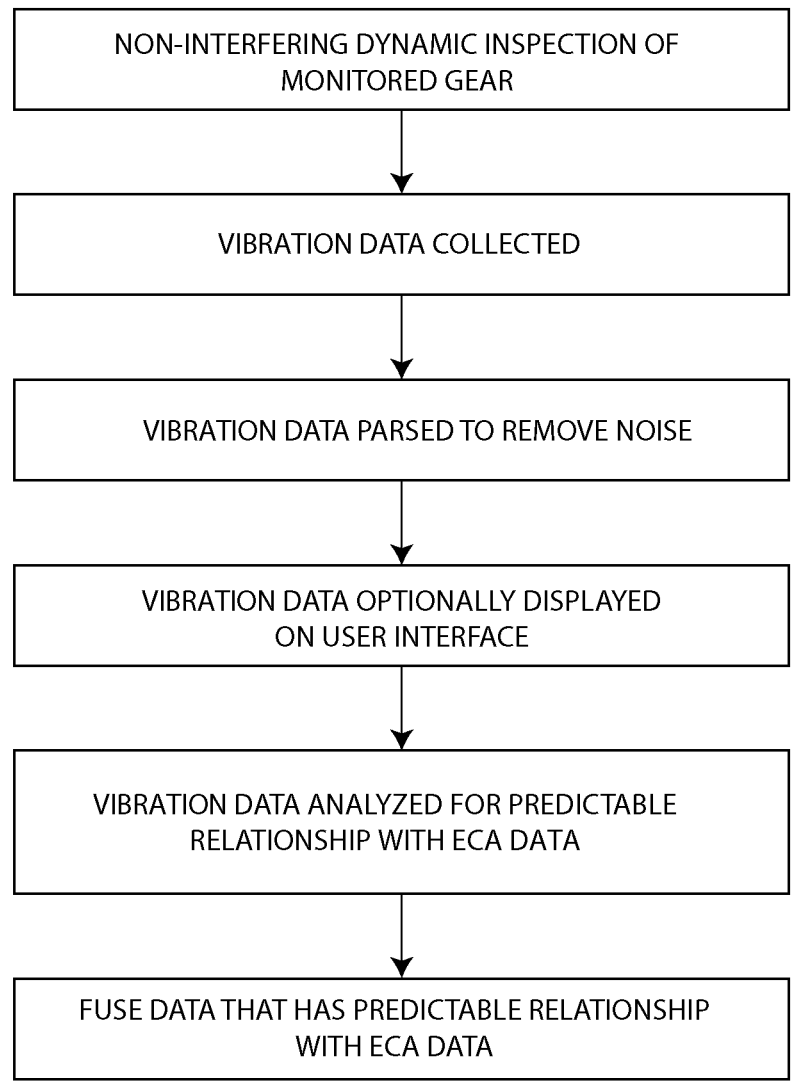
FIG. 10 is a flow chart for determining data from non-interfering dynamic inspection of a driver gear that has a predictable relationship with ECA data.

As shown in FIG. 10, the non-interfering dynamic inspection of the driver gear was used to predict the health of the driven gear. ECA results from the driven gear were used to determine if there was a predictable relationship between the ECA results and the vibration data of the driver gear.

Figure 11:
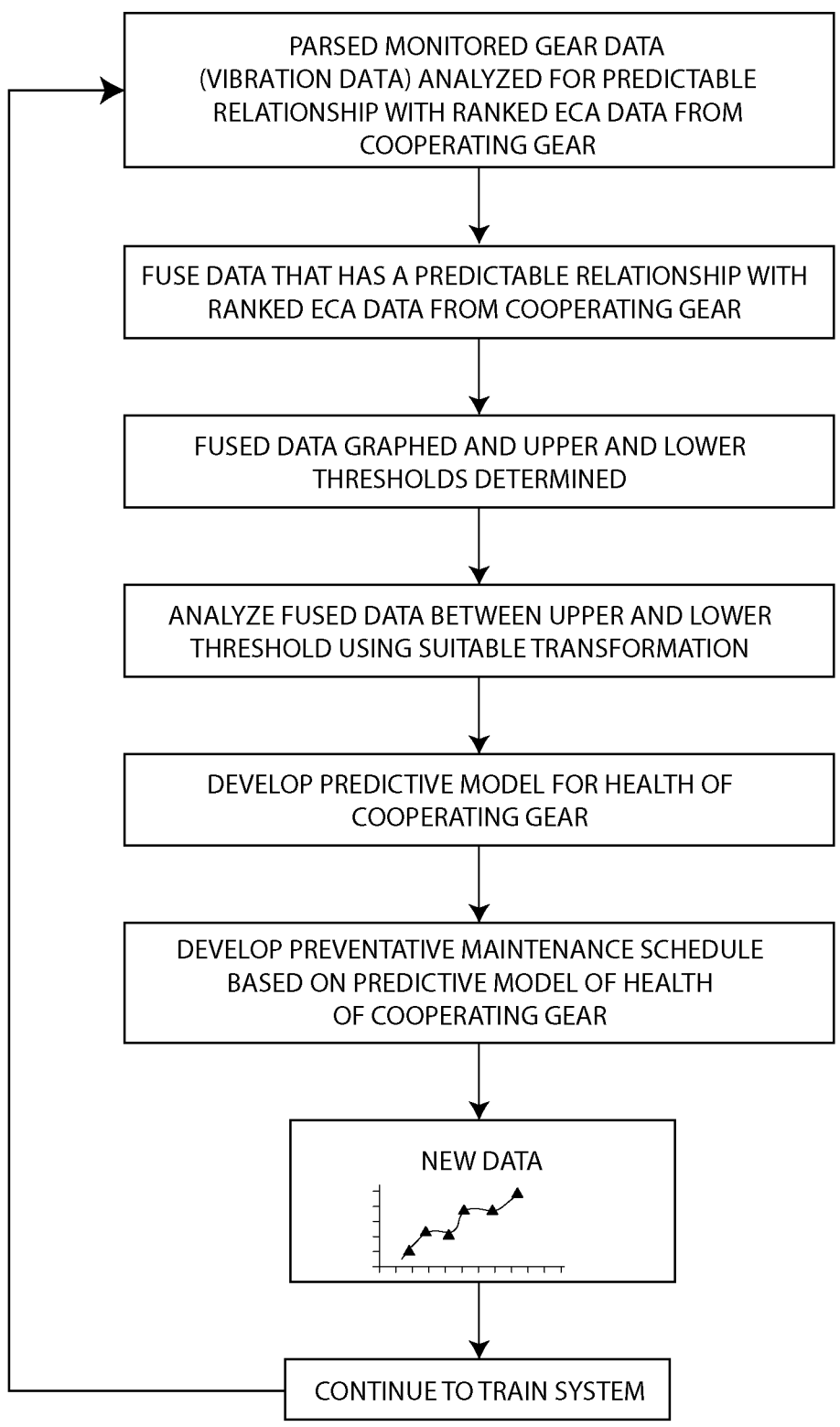
FIG. 11 is a flow chart for developing a preventative maintenance schedule for a driven gear.

As shown in FIG. 11, those data from the driver gear that had a predictable relationship with the ECA data from the driven gear were graphed and the upper and lower thresholds defining a healthy open gear and an unhealthy open gear were defined. An early predictive model of health was determined and used to develop a preventative maintenance schedule for the driven gear. The addition of new data allows for the system to continue to be trained.

As shown in FIG. 12, the non-interfering dynamic inspection of the driver gear was used to predict the health of the driven gear. ECA results from the driven gear were used to determine if there was a predictable relationship between the ECA results and digital thermal data, digital optical data and vibration data of the driver gear.

As shown in FIG. 13, those data from the driver gear that had a predictable relationship with the ECA data from the driven gear were graphed and the upper and lower thresholds defining a healthy open gear and an unhealthy open gear were defined. An early predictive model of health was determined and used to develop a preventative maintenance schedule for the driven gear. The addition of new data allows for the system to continue to be trained.

As shown in FIG. 14A-C, the online monitoring can give a general trend of machinery degeneration process, while the ECA inspection, which indicates a quantified defect degree, was used to fine-tune the condition indicator. Thus, a more reliable and robust degeneration trend can be estimated. According to the estimated trend, the real-time gear health status can be concluded by checking the tuned condition indicator over time. A prediction model was built to forecast the remaining useful life, warning of potential failure, and failure time interval. The prediction methods, such as Kalman filtering, particle filtering, and Bayesian model, were investigated. FIG. 14 is an example of integrated decision-making: FIG. 14A illustrates a monitored open gear condition indicator (thermal imagery, optical imagery and optionally, vibration data); FIG. 14B illustrates a cooperating open gear degeneration process (ECA); and FIG. 14C illustrates integrated decision making.

FIG. 15 is a schematic of the overall system architecture for the gear condition monitoring and predictive maintenance (CMPM).

FIG. 16 is a schematic of the open system architecture for CMPM.

As shown in FIG. 17, the non-interfering dynamic inspecting system, generally referred to as 110 which includes the non-contact thermal sensor 16, the optical camera 18 and the vibration sensor 20, are all in communication with the programmable logic controller 22 and at least one computing device 24. The computing device 24 is in wired or wireless communication with a control switch 150, which controls the speed at which the driver gear 12 rotates, and hence the speed of the open gear set 14. It also functions as an ON/Off switch. The computing device 24 is also in wired or wireless communication with a feed controller 152, which controls the speed at which the mill is provided with rock and also functions as an ON/OFF switch for the feed mechanism 154. The computing device 24 is also in wired or wireless communication with a sensor 156 which senses the passage of crushed rock, slurry or other material as it exits the open gear set 14. The computing device 24 is also in wired or wireless communication with a reciprocating washer 158 which is located proximate to the open gear set 14. The reciprocating washer 158 is under control of a microprocessor, which communicates with a stepper driver circuit which in turn, steps the stepper motor. The stepper drive circuit includes speed control, including variable speed control. Variable speed control can be used to reduce the speed of travel as the gantry nears the end or travel.

As shown in FIG. 18, the system can autonomously shut down the open gear set and clean it. One or more of digital optical data and thermal data show contamination of the open gear set. The processor, upon receiving the data, signals the feed controller to stop the conveyor belt or other suitable feed mechanism, which leads to emptying of the mill. The sensor indicates to the processor that no slurry is exiting the mill. Once the mill is emptied, the processor signals the control switch to slow the driver gear to an inching speed. Concomitantly, the processor signals the reciprocating washer to begin to wash the gears. Cleaning continues until all the gears have been cleaned. The gears are then inspected using ECA.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. For example, other imaging techniques may be used, resulting in other images being analyzed. Such equivalents are intended to be encompassed in the scope of the claims, if appended hereto or subsequently filed.

The invention claimed is:

1. A system for cleaning and developing a preventative maintenance schedule using a predictive model of wear and damage to an open gear set of a rock crushing mill, which comprises a driven gear and a driver gear, the system comprising: an eddy current array probe, which is configured to generate and transmit scans of teeth of one gear of the open gear set; a non-interfering dynamic inspecting system which includes at least one non-interfering dynamic imager which is positioned and configured to generate and transmit digital images of another gear of the open gear set; a computing device which is electronic communication with the eddy current array probe and the non-interfering dynamic imager, and which includes a memory and a processor, the processor under control of the memory, wherein the memory is configured to receive the scans from the eddy current array probe and receive the digital images from the non-interfering dynamic imager, determine changes in both the scans and the digital images over time, statistically analyze the changes in relation to time to provide a set of time-based features, apply the time-based features as input values to a selected transformation, develop a predictive model of health and remaining useful life of the open gear set using the selected transformation and develop a preventative maintenance schedule involving cleaning the open gear set based on the predictive model; a sensor which is configured to sense the passage of a slurry or rock from the open gear set; and a reciprocating washer, which includes a nozzle mounted on a cart which is slidably, reciprocally mounted on a rail and which is in electronic communication with the processor, the reciprocating washer for cleaning the open gear set based on the predictive model.

2. The system of claim 1, wherein the non-interfering dynamic imager is a thermal sensor.

3. The system of claim 2, wherein the thermal sensor is an infrared camera.

4. The system of claim 3, comprising a second non-interfering dynamic imager which is an optical camera.

5. The system of claim 4, wherein the eddy current array probe is configured to generate and transmit scans of the driven gear.

6. The system of claim 5, wherein the non-interfering dynamic imager is positioned to generate and transmit digital images of the driver gear.

7. The system of claim 6, wherein the driven gear is a girth gear and the driver gear is a pinion gear of a girth gear set.

8. The system of claim 7, further comprising a vibration sensor, the vibration sensor configured to generate and send vibration data to the computing device.

9. A system for cleaning and developing a preventative maintenance schedule using predictive modeling of wear and damage to a driven gear of an open gear set of a rock crushing mill, the system comprising: a non-interfering dynamic inspecting system which includes at least one non-interfering dynamic imager which is positioned and configured to generate and transmit digital images of a driver gear of the open gear set; a computing device which is electronic communication with the non-interfering dynamic imager, and which includes a memory and a processor, the processor under control of the memory, wherein the memory retains a predictive model of health and remaining useful life of the driven gear and is configured to receive the digital images of the driver gear, determine changes in the digital images over time, statistically analyze the changes in relation to the predictive model of health and remaining useful life of the driven gear, and develop a preventative maintenance schedule; a sensor which is configured to sense the passage of a slurry or rock from the open gear set; and a reciprocating washer, which includes a nozzle mounted on a carriage which is slidably, reciprocally mounted on a rail and is and which is in electronic communication with the processor, the reciprocating washer for cleaning the open gear set based on the predictive model.

10. The system of claim 9, wherein the non-interfering dynamic imager is a thermal sensor.

11. The system of claim 10, wherein the thermal sensor is an infrared camera.

12. The system of claim 11, comprising a second non-interfering dynamic imager which is an optical camera.

13. The system of claim 12, wherein the system is autonomous.

14. The system of claim 13, further comprising a vibration sensor, the vibration sensor configured to generate and send vibration data to the computing device.

15. A method of developing a preventative maintenance schedule using a predictive model of wear and damage to an open gear set of a rock crushing mill, which comprises a driven gear and a driver gear, and cleaning the open gear set, the method comprising: selecting a system comprising a non-interfering dynamic inspecting system which includes at least one non-interfering dynamic imager, a computing device which is electronic communication with the non-interfering dynamic imager, and which includes a memory and a processor, the processor under control of the memory; a sensor which is configured to sense the passage of a slurry or rock from the open gear set; and a reciprocating washer, which includes a nozzle mounted on a carriage which is slidably, reciprocally mounted on a rail and which is in electronic communication with the processor, the non-interfering dynamic imager generating and transmitting digital images of teeth of a gear of the open gear set to the computer; the computer analyzing, compiling and storing the digital images and the scans as a data set; the computer determining changes in the data set over time, statistically analyzing the changes in relation to time to provide a set of time-based features, applying the time-based features as input values to a selected transformation, developing a predictive model of health and remaining useful life of the open gear set using the selected transformation, and developing a preventative maintenance schedule, the sensor sensing the passage of a slurry or crushed rock from the open gear set and cleaning the open gear set with the reciprocating washer based on the predictive model.

16. The method of claim 15, wherein the non-interfering dynamic imager generates thermal digital images.

17. The method of claim 16, wherein a second non-interfering dynamic imager generates optical digital images.

18. The method of claim 15, further comprising reducing a speed of travel as the carriage nears an end of travel.

19. The method of claim 18, further comprising the processor signaling a feed controller to stop a feed mechanism for the mill prior to cleaning the open gear set.

20. The method of claim 19, further comprising the sensor indicating to the processor that no slurry is exiting the mill.

21. The method of claim 20, further comprising the processor signaling a control switch to slow the driver gear to an inching speed after the feed mechanism has stopped and before the open gear set is cleaned.

22. The method of claim 21, wherein the cleaning is concomitant with the driver gear inching.

* * * * *